United States Patent [19]

Aso et al.

[11] Patent Number: 4,707,580
[45] Date of Patent: Nov. 17, 1987

[54] WIRE-CUT ELECTRICAL DISCHARGE MACHINE

[75] Inventors: Toshiyuki Aso; Hiroshi Kinoshita, both of Hino, Japan

[73] Assignee: Fanuc Ltd., Yamanashi, Japan

[21] Appl. No.: 859,988

[22] PCT Filed: Aug. 16, 1985

[86] PCT No.: PCT/JP85/00458

§ 371 Date: Apr. 23, 1986

§ 102(e) Date: Apr. 23, 1986

[87] PCT Pub. No.: WO86/01445

PCT Pub. Date: Mar. 13, 1986

[30] Foreign Application Priority Data

Aug. 27, 1984 [JP] Japan ............................. 59-176702

[51] Int. Cl.$^4$ .......................... B23H 7/02; B23H 7/10
[52] U.S. Cl. ................................ 219/69 W; 219/69 D
[58] Field of Search ...................... 219/69 W, 69 D; 204/206, 224 M

[56] References Cited

U.S. PATENT DOCUMENTS

| 4,205,212 | 5/1980 | Ullmann et al. | 219/69 W |
| 4,250,371 | 2/1981 | Haug et al. | 219/69 W |
| 4,459,454 | 7/1984 | Inoue | 219/69 W |
| 4,460,816 | 7/1984 | Bonga | 219/69 W |
| 4,539,459 | 9/1985 | Yamagata | 219/69 W |

FOREIGN PATENT DOCUMENTS

| 157430 | 12/1980 | Japan | 219/69 W |
| 57-1624 | 1/1982 | Japan | 219/69 D |
| 109230 | 6/1983 | Japan | 219/69 C |
| 93240 | 5/1984 | Japan | 219/69 D |
| WO84/02485 | 7/1984 | PCT Int'l Appl. | 219/69 E |
| WO85/01907 | 5/1985 | PCT Int'l Appl. | 219/69 D |

Primary Examiner—A. D. Pellinen
Assistant Examiner—Geoffrey S. Evans
Attorney, Agent, or Firm—Armstrong, Nikaido, Marmelstein & Kubovcik

[57] ABSTRACT

A wire-cut electrical discharge machine for machining a workpiece (W) through wire-cut electrical discharge machining by employment of an electrode wire (60) which runs from one to the other of upper and lower guide assemblies each having a cooling liquid supply passage (62) and a main passage (64) communicating with the cooling liquid supply passage (62). At least either the upper guide assembly or the lower assembly is provided with a restrictor valve (68) provided in a branch passage (66) branched from the main passage (64) and capable of varying the effective sectional area of the liquid passage of its own according to the pressure of the cooling liquid supplied from the cooling liquid supply passage (62) into the branch passage. The cooling liquid that passed the restrictor valve (68) is introduced into the vicinity of the feeder pin (42) of the guide assembly to cool the feeder pin (42) and the electrode wire running in the vicinity of the feeder pin (42).

5 Claims, 4 Drawing Figures

WIRE-CUT ELECTRICAL DISCHARGE MACHINE

DESCRIPTION

1. TECHNICAL FIELD

The present invention relates to a wire-cut electrical discharge machine and, more particularly, to a wire-cut electrical discharge machine equipped with an improved cooling system at least in the upper wire guide assembly of the wire guide unit, for cooling the feeder pin.

2. BACKGROUND ART

A wire-cut electrical discharge machine feeds an electrode in the form of an electroconductive wire, referred to as an electrode wire, wound on a feed reel through a tensioning brake drum, a guide roller, an upper guide assembly, a lower guide assembly, and a motor-driven winding roller, and winds the electrode wire onto a take-up reel, while an electric discharge voltage is applied through the feeder pins to the electrode wire across the upper and lower guide assemblies to discharge sparks between the electrode wire and a workpiece placed on an X-Y table for electrical discharge machining. The upper and lower wire guide assemblies are disposed above and below the X-Y table, respectively, and are provided with feeder pins, upper and lower guide heads for guiding the electrode wire along a straight line through the workpiece, and cooling liquid supply passages, respectively. During the electrical discharge machining operation, an electric current flows through the feeder pins and the workpiece. Although the intensity of the electric current is dependent on the machining conditions, normally, the intensity of the electric current is about 10A. Ordinarily, the electrode wire is a brass wire having a diameter in the range of 0.1 to 0.3 mm. Accordingly, a high Joulean heat is produced in the electrode wire when such an electric current flows through the electrode wire. In order to prevent objectionable overheating of the electrode wire due to the Joulean heat produced therein, a cooling liquid is supplied through the cooling liquid supply passage to a cooling nozzle formed so as to surround the electrode wire and the cooling liquid is spouted through the cooling nozzle against the working portion of the electrode wire running near the workpiece, to cool the electrode wire. Since not only the working portion of the electrode wire but also a portion of the same between the point of contact between the electrode wire and the feeder pin and the wire guide head needs to be cooled, part of the cooling liquid introduced into the cooling liquid supply passage is supplied through a narrow branch passage to the feeder pin to cool the feeder pin and a portion of the electrode wire in the vicinity of the feeder pin.

Recently, the electrical discharge machining speed has been increased and the enhancement of the cooling effect and the chip removing effect has been a significant subject of improvement. In a recent wire-cut electrical discharge machine, the cooling liquid is spouted at a comparatively high pressure, for example, at 5 atm. Accordingly, the cooling liquid is spouted at a high pressure also against the feeder pin, and thereby the cooling liquid is sprayed outside the wire-cut electrical discharge machine to contaminate the environment of the wire-cut electrical discharge machine, for example, to soil the adjacent machines with the spray of the cooling liquid.

When the diameter of the narrow branch passage for supplying the cooling liquid to the feeder pin is reduced further to suppress the increase of the pressure of the cooling liquid supplied to the feeder pin as a means of solving such a problem, the cooling liquid is insufficiently supplied to the feeder pin and, sometimes, the cooling liquid is not supplied at all to the feeder pin when the pressure of the cooling liquid, particularly, the pressure of the cooling liquid at the cooling nozzle, is reduced to the lowest possible extent to meet the operating conditions of the wire-cut electrical discharge machine. Accordingly, the wire-cut electrical discharge machine needs a feeder pin cooling system capable of controlling the flow rate of the cooling liquid supplied to the feeder pin according to the pressure of the cooling liquid introduced into the cooling liquid supply passage from an external source of the cooling liquid.

DISCLOSURE OF THE INVENTION

It is an object of the present invention to incorporate a feeder pin cooling system capable of meeting the above-mentioned requirements at least into the upper wire guide assembly of the wire guide unit of a wire-cut electrical discharge machine in order to regulate the flow rate of the cooling liquid to be supplied to the feeder pin according to the variation of the supply pressure of the cooling liquid so that an appropriate cooling effect is provided.

The present invention provides a wire-cut electrical discharge machine comprising upper and lower guide assemblies disposed above and below a workpiece, respectively, and each having electrode wire guiding means, a feeder pin for applying an electrical discharge voltage to an electrode wire which runs from one to the other of the upper and lower guide assemblies, and a cooling liquid supply passage for distributing the cooling liquid supplied thereto from an external source of cooling liquid to the electrode wire guiding means and the feeder pin; and capable of carrying out the electrical discharge machining of the workpiece by means of the electrode wire, wherein at least one of the upper guide assembly and the lower guide assembly is provided with a main passage communicating with the cooling liquid supply passage and extending toward the electrode wire guiding means, for cooling the electrode wire, a branch passage communicating with the main passage, a restrictor valve provided in the branch passage in order to regulate the effective sectional area of the branch passage, and liquid supply means for supplying the cooling liquid that passed the restrictor valve to the environment of the feeder pin.

BEST MODE FOR CARRYING OUT THE INVENTION

First, a conventional upper guide assembly will be described with reference to FIG. 4 prior to the description of a preferred embodiment of the present invention to facilitate the understanding of the present invention.

Figure 4:
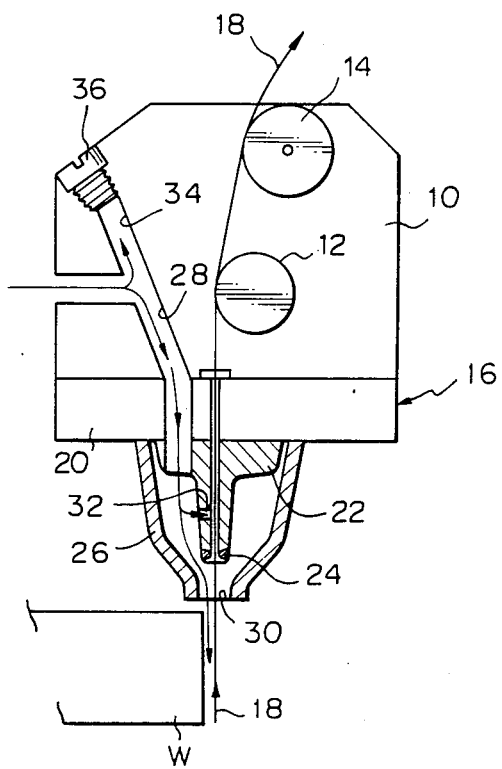
FIG. 4 is a sectional view of a conventional upper guide assembly for a wire-cut electrical discharge machine, showing the constitution thereof.

Referring to FIG. 4, the upper guide assembly has a bracket 10 which is attached to the upper head, not shown, of a wire-cut electrical discharge machine. A feeder pin 12 made of an extra hard steel, an electrode wire guide roller 14, and a guide head 16 are attached to the bracket 10 to guide an electrode wire 18 by a workpiece W. The guide head 16 comprises a lateral member 20, a guide holder 22, a jewel guide piece 24 and a nozzle 26 for spouting a cooling liquid. A main cooling liquid supply passage 28 is formed through the bracket 10, the lateral member 20 and part of the guide holder 22. The cooling liquid supplied to the upper guide assembly from an external source of cooling liquid flows through the main cooling liquid supply passage 28 and is spouted through the nozzle hole 30 of the nozzle 26 against the electrode wire 18. Part of the cooling liquid introduced into the nozzle 26 flows up to the feeder pin 12 through a narrow lateral hole 32 formed in the guide holder 22 and an electrode wire passage formed through the guide holder 22 and the lateral member 20 to cool the electrode wire 18 in the interval between the jewel guide piece 24 and the feeder pin 12. This conventional wire guide assembly, however, is unable to inhibit the cooling liquid from being sprayed outside of the wire guide assembly even if a cooling liquid sump, not shown, is provided so as to surround the feeder pin 12, when the supply pressure of the cooling liquid is increased. In FIG. 4, indicated at 34 is a hole formed for forming the main cooling liquid passage 28, which is plugged with a plug screw 36.

Now, a feeder pin cooling means, in a preferred embodiment, according to the present invention will be described hereinafter with reference to FIGS. 1 to 3. The embodiment illustrated in FIGS. 1 and 2 is an exemplary application of the present invention to the upper wire guide assembly of a wire-cut electrical discharge machine.

Figure 1:
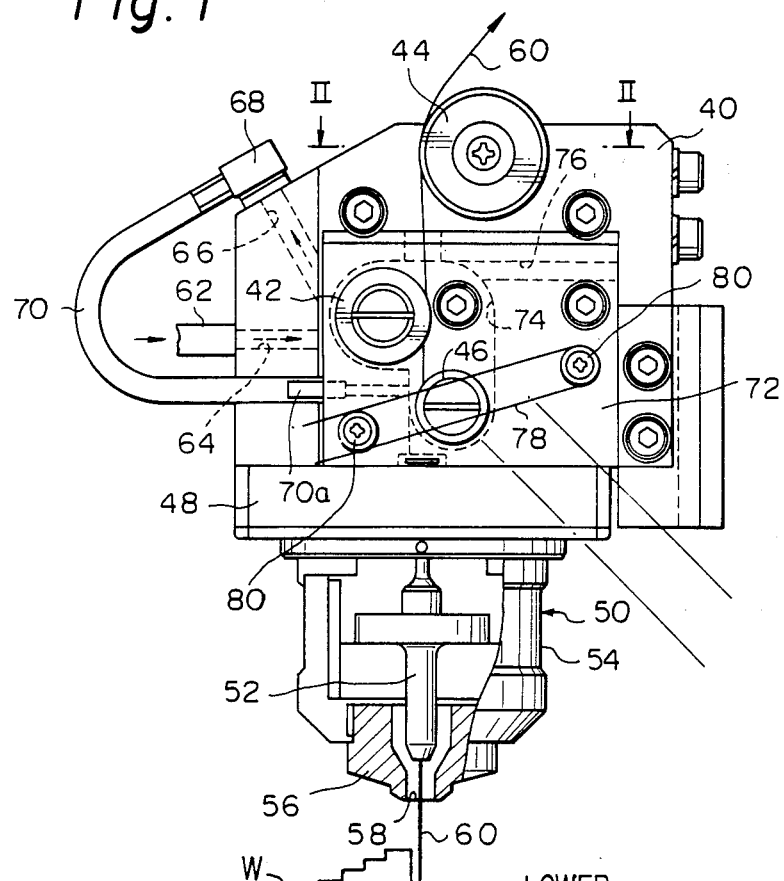
FIG. 1 is a front elevation showing an upper guide assembly incorporating an improved feeder pin cooling means, employed in a wire-cut electrical discharge machine and a partial sectional view of a similar lower guide assembly, in a preferred embodiment, according to the present invention.
Figure 2:
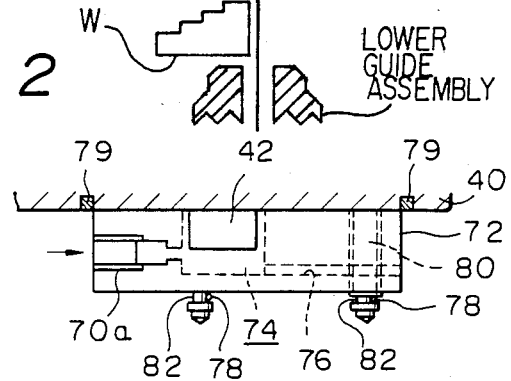
FIG. 2 is a fragmentary top plan view taken in a plane corresponding to line II—II in FIG. 1.

Referring to FIGS. 1 and 2, the upper wire guide assembly has a bracket 40 fixed to the upper head, not shown, of a wire-cut electrical discharge machine with bolts. Similarly to the bracket of the above-mentioned conventional upper wire guide assembly, the bracket 40 is pivotally mounted with a feeder pin 42 and an electrode wire guide roller 44. A V-grooved guide 46 is attached to the bracket 40 below the electrode wire guide roller 44. A wire guide head 50 is attached to a lateral member 48 attached to the lower end of the bracket 40. The wire guide head 50 comprises, similarly to the conventional wire guide head, a guide block 52 internally provided with a jewel guide piece, a guide holder 54 holding the guide block 52 and a nozzle 56 surrounding the lower portion of the guide block 52. The nozzle 56 has a nozzle hole 58 for spouting the cooling liquid around the lower end of the guide block 52. An electrode wire 60 enters the guide block 52 through the lower end of the same, runs past the jewel guide piece, is brought into contact with the feeder pin 42 by the V-grooved guide 46, and then runs further upward via the electrode wire guide roller 44. Accordingly, while running below the lower end of the guide block 52, the electrode wire 60 is cooled by the cooling liquid spouted through the nozzle hole 58. Similarly to the main cooling liquid supply passage of the above-mentioned conventional upper wire guide unit, a main cooling liquid supply passage 64 is formed through the bracket 40, the lateral member 48, the guide holder 54 of the wire guide head 50 and the base of the guide block 52. A conduit 62 connected to a source of cooling liquid is connected to the inlet of the main cooling liquid supply passage 64. The cooling liquid supplied from the source of cooling liquid through the conduit 62 to the upper wire guide assembly flows through the main cooling liquid supply passage 64 and is spouted through the nozzle hole 58 of the nozzle 56. According to the present invention, part of the cooling liquid is guided through a branch passage 66 branched from the main cooling liquid supply passage 64 to a restrictor valve 68, which reduces the flow rate of the cooling liquid when the pressure of the cooling liquid is high. The cooling liquid passed through the restrictor valve 68 is introduced through a conduit 70 into the vicinity of the feeder pin 42 to cool the feeder pin 42 and the electrode wire 60 running in the neighborhood of the feeder pin 42. This embodiment of the present invention is provided with a feeder pin cover 72 detachably attached to the bracket 40 and internally provided with a cooling liquid sump 74 formed so as to surround the feeder pin 42. The cooling liquid is supplied through the conduit 70 into the cooling liquid sump 74 and is stored temporarily in the cooling liquid sump 74. The cooling liquid sump 74 stores an appropriate quantity of the cooling liquid and drains the excessive cooling liquid. Accordingly, the feeder pin 42 is cooled by the cooling liquid contained in the cooling liquid sump 74 and the electrode wire 60 is also cooled by the cooling liquid contained in the cooling liquid sump 74 as the electrode wire runs upward from the wire guide head 50 through the feeder pin cover 72. When the feeder pin cover 72 is made of a synthetic resin, such as acrylic resin, to enable the observation of the interior of the cooling liquid sump 74, the inspection of the quantity of the cooling liquid contained in the cooling liquid sump 74 is possible. Indicated at 76 is a drain passage for draining the excessive cooling liquid outside when the quantity of the cooling liquid in the cooling liquid sump 74 exceeds a fixed value. Indicated at 78 is a holding pin which is inserted in grooves 82 formed in the upper ends of studs 80 fixed to the bracket 40 to hold the feeder pin cover 72 easily detachably on the bracket 40. Naturally, it is preferable to provide a sealing member 79 between the feeder pin cover 72 and the bracket 40 in order to prevent the leakage of the cooling liquid from the feeder pin cover 72. The conduit 70 is connected to a hose joint 70a to interconnect the branch passage 66 and the cooling liquid sump 74.

The restrictor valve 68 of the feeder pin cooling means is provided in the line for supplying the cooling liquid to the feeder pin 42. As illustrated in FIG. 3, the restrictor valve 68 comprises a tubular valve body 86 made of a metal, such as a stainless steel, and a ball 88. A valve chest 90 for receiving the ball 88 therein, a main passage 92, a by-pass passage 94 and an outlet passage 96 are formed in the valve body 86. The ball 88 is placed within the valve chest 90. When the ball 88 is moved to the upper position as indicated by broken line in FIG. 3 by the pressure of the cooling liquid flowing upward into the valve chest 90, the main passage 92 is closed and the cooling liquid is allowed to flow only through the by-pass passage 94 into the outlet passage 96. Accordingly, when the cooling liquid is supplied to the upper wire guide assembly at a high pressure for high-speed wire-cut electrical discharge machining, the flow rate restricting function of the restrictor valve 68 reduces the effective sectional area of the passage for supplying the cooling liquid to the feeder pin 42 to suppress the flow rate of the cooling liquid flowing toward the feeder pin 42 to regulate the flow rate at an appropriate level.

Figure 3:
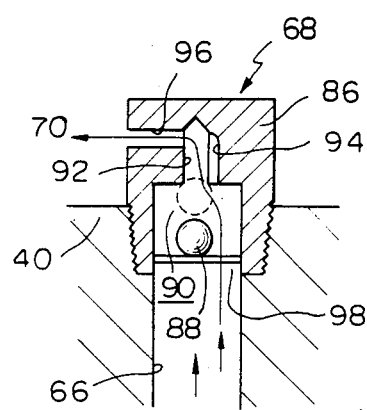
FIG. 3 is a sectional view of a restrictor valve employed in the feeder pin cooling means, showing the construction thereof.

While the cooling liquid is supplied to the upper wire guide assembly at a low pressure for low-speed wire-cut electrical discharge machining, the ball 88 of the restrictor valve 68 stays at the lower position indicated by a solid line in FIG. 3, and thereby the cooling liquid is allowed to flow through both the main passage 92 and the by-pass passage 94. That is, the effective sectional area of the flow passage is increased so that sufficient cooling liquid is supplied to the feeder pin 42. A retaining pin 98 for retaining the ball 88 within the valve body 86 is inserted in the lower end of the valve body 86. The restrictor valve 68 is screwed in as shown in FIG. 3 or attached by suitable means to the bracket 40.

As apparent from the foregoing description, according to the present invention, a restrictor valve capable of regulating the effective sectional area of the passage according to the pressure of the cooling liquid in the passage is provided in a passes for supplying a cooling liquid to the feeder pin of a wire-cut electrical discharge machine; consequently, when the cooling liquid is supplied to the wire-cut electrical discharge machine at a high pressure for high-speed wire-cut electrical discharge machining, the flow rate of the cooling liquid directed toward the feeder pin is appropriately suppressed, and thereby the cooling liquid is prevented from being sprayed outside the wire-cut electrical discharge machine and, even when the cooling liquid is supplied to the wire-cut electrical discharge machine at a low pressure for comparatively low-speed wire-cut electrical discharge machining, sufficient cooling liquid is supplied to the feeder pin. Accordingly, the feeder pin and the portion of the electrode wire running in the vicinity of the feeder pin are always cooled properly.

Although the invention has been described as applied to the upper wire guide assembly of a wire-cut electrical discharge machine, it is also possible to provide the lower wire guide assembly with a feeder pin cooling system having the same restrictor valve, as occasion demands.

We claim:

1. Wire-cut electrical discharge machine, capable of carrying out wire-cut electrical discharge machining of an electrically conductive workpiece by means of an electrode wire, comprising:

upper and lower guide assemblies disposed, respectively, above and below said workpiece, each having electrode wore guiding means for guiding said electrode wire, which runs from one toward the other of said upper and lwoer guide assemblies, and a feeder pin for applying a discharge voltage to said electrode wire;

a cooling liquid supply means for at least one of said upper guide assembly and lower guide assembly, said cooling liquid supply means including a main supply passage communicating with an external source of cooling liquid for distributing said cooling liquid to said electrode wire guiding means for cooling aid electrode wire;

a cooling liquid sump formed so as to surround said feeder pin and form a cooling liquid chamber separating said feeder pin from said electrode wire guiding means;

a branch passage communicating with said main supply passage and having a restrictor valve therein to regulate the effective sectional area of said branch passage; and conduit means connected between said restrictor valve and said cooling liquid sump to supply liquid from said branch passage that passes said restrictor valve to said cooling liquid sump as the only source of cooling liquid thereto.

2. a wire-cut electrical discharge machine according to claim 1 wherein said restrictor valve has a ball which is controlled by the pressure of the cooling liquid so as to open or close the passage of the cooling liquid, and a by-passage having a small sectional area.

3. A wire-cut electrical discharge machine according to claim 1, wherein said cooling liquid sump includes a drain passage for draining excess cooling liquid when cooling liquid level in said sump exceeds a fixed value.

4. wire-cut electrical discharge machine according to claim 1, wherein said cooling liquid chamber is a cavity formed inside a detachable cover for covering the feeder pin.

5. A wire-cut electrical discharge machine according to claim 1, wherein at least one of the upper guide assembly and the lower guide assembly has a bracket provided internally with said main passage and said branch passage, said electrode wire guiding means is attached to the bracket through another bracket, and said feeder pin is attached pivotally to the former bracket.

* * * * *